(No Model.)　　　W. W. SUTCLIFFE.　　　3 Sheets—Sheet 1.
BAGASSE FURNACE.
No. 517,497.　　　　　　　Patented Apr. 3, 1894.
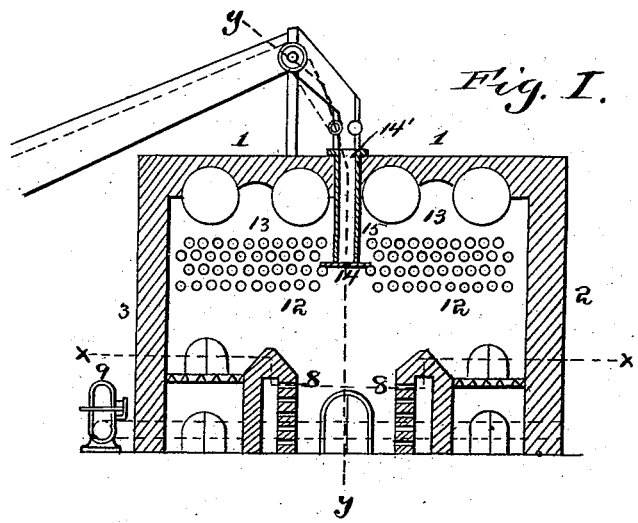
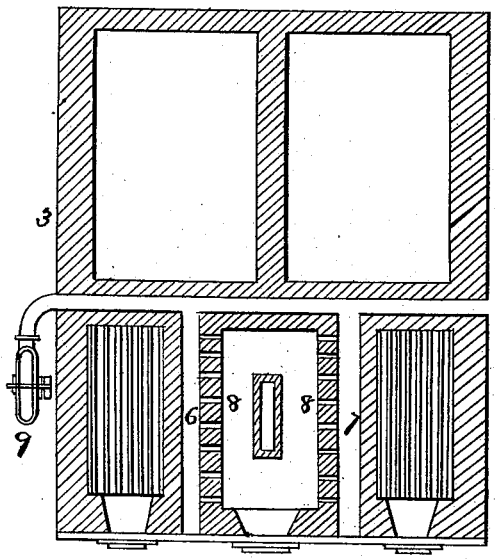
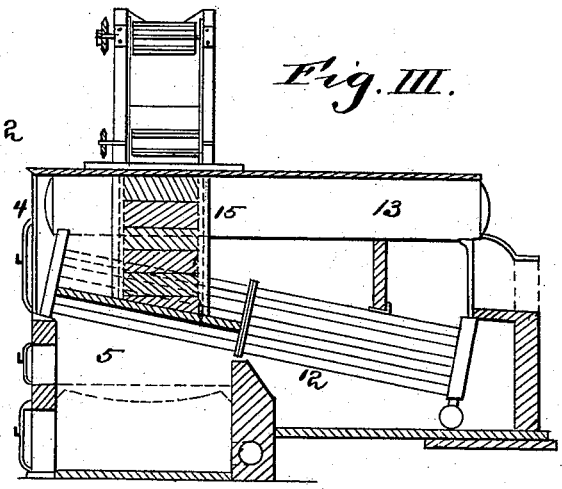
Witnesses:
Inventor
William W. Sutcliffe
By his Attorneys (No Model.) W. W. SUTCLIFFE. 3 Sheets—Sheet 2.
BAGASSE FURNACE.
No. 517,497. Patented Apr. 3, 1894.
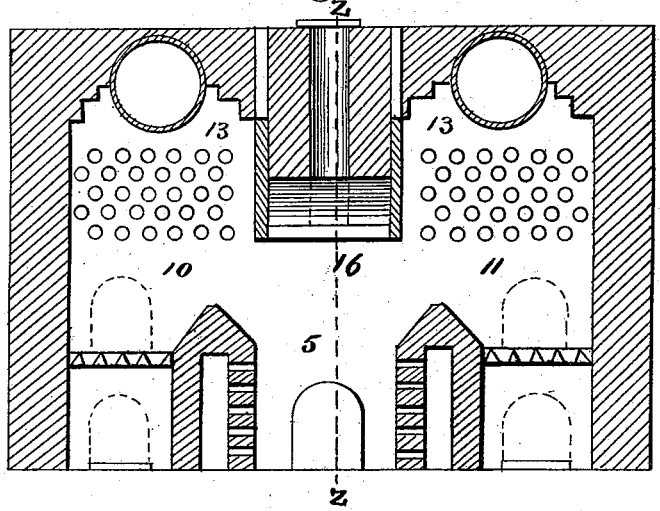
Fig. IV.
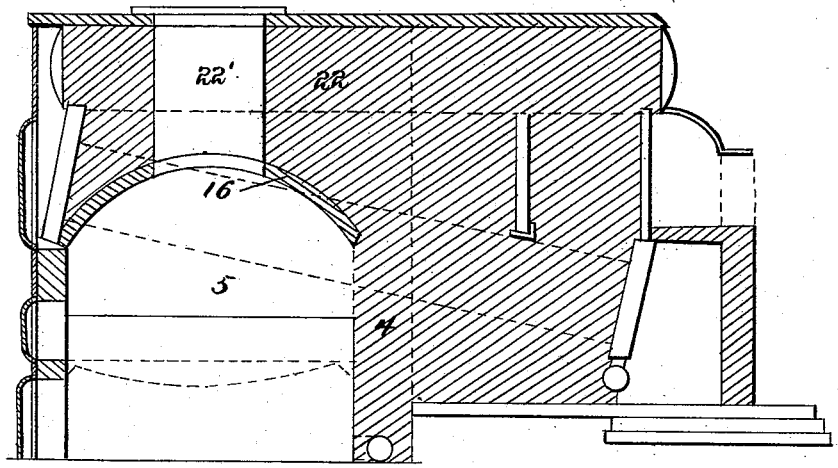
Fig. V.
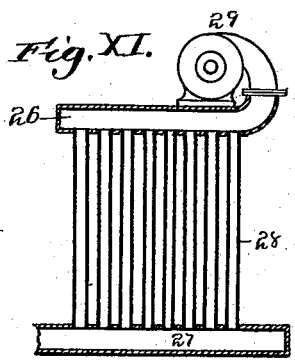
Fig. XI.  Fig. XII.
Witnesses:  Inventor,
  William W. Sutcliffe
  By his Attorneys,
  Edson Bros (No Model.)  3 Sheets—Sheet 3.
W. W. SUTCLIFFE.
BAGASSE FURNACE.
No. 517,497. Patented Apr. 3, 1894.
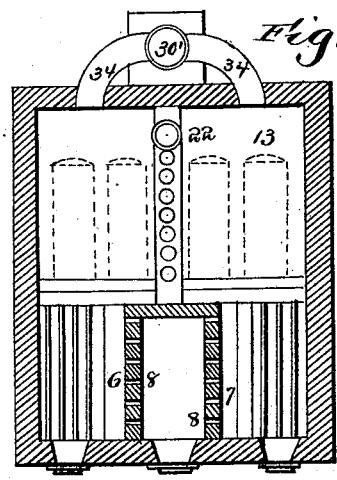
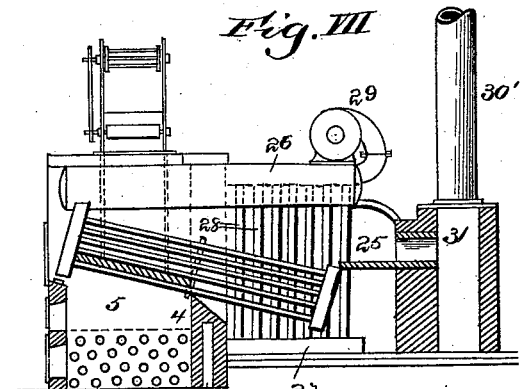
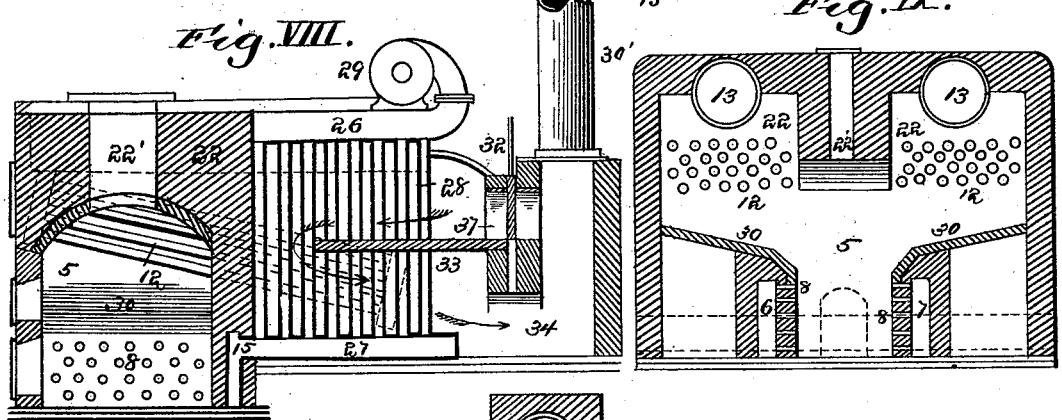
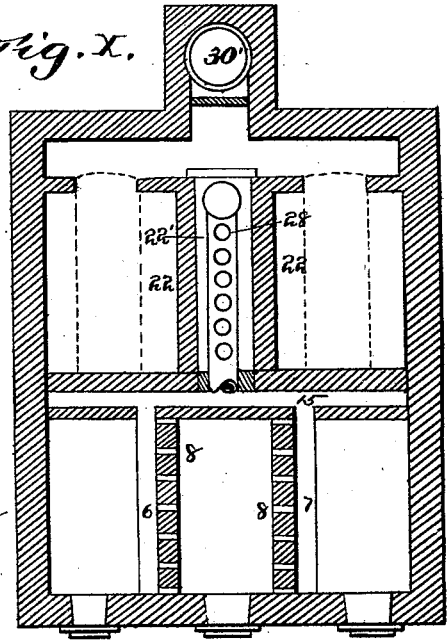
Witnesses:
Inventor.
William W. Sutcliffe
By his attys,
Edwin Bros.

UNITED STATES PATENT OFFICE.

WILLIAM WILSON SUTCLIFFE, OF NEW ORLEANS, LOUISIANA.

BAGASSE-FURNACE.

SPECIFICATION forming part of Letters Patent No. 517,497, dated April 3, 1894.

Application filed April 7, 1891. Renewed February 3, 1894. Serial No. 499,019. (No model.)

*To all whom it may concern:*

Be it known that I, WILLIAM WILSON SUTCLIFFE, a citizen of the United States, residing at New Orleans, in the parish of Orleans and State of Louisiana, have invented certain new and useful Improvements in Bagasse-Furnaces; and I do hereby declare the following to be a full, clear, and exact description of the invention, such as will enable others skilled in the art to which it appertains to make and use the same.

Figure I is a front sectional elevation of my improved furnace. Fig. II is a horizontal sectional view on the plane indicated by the dotted line $x-x$ of Fig. I, with the parts in plan. Fig. III is a sectional elevation on the line $y-y$ of Fig. I. Fig. IV is a sectional view similar to Fig. I, partly in elevation, of a modified form of partitions and supports therefor. Fig. V is a sectional elevation on the line $z-z$ of Fig. IV. Fig. VI is a horizontal section showing in plan the construction adopted when the air-heater is employed, and Fig. VII is a vertical longitudinal section of the construction shown in Fig. VI. Figs. VIII, IX and X are views in transverse section, horizontal section, and longitudinal section respectively, of another modified construction employing the air heater, and Figs. XI and XII are detail views of the air heater.

The present invention relates to improvements in bagasse furnaces, and among other things it has for its object to secure an economic, compact and effective construction of a furnace designed to utilize green bagasse as fuel under steam boilers, particularly boilers of that class known as water-tube boilers, although other kinds of boilers may be employed, and to enable the rapid generation of steam, and the maintenance thereof, in the boilers, with the least possible amount of fuel.

A further object of my invention is to arrange and combine the bagasse furnace with auxiliary furnaces (designed to consume wood and coal as fuel) forming a continuous or the same fire bed, and to insure the admixture and combination of the gases and products of combustion from all the furnaces, prior to the commingled gases and products of combustion reaching the steam generators, and to cause the same to act directly on the divided battery of steam boilers or generators at the extreme forward ends of the same and throughout their entire length as long as the fires in both furnaces (the auxiliary and bagasse) are continued. I may, however, dispense with the auxiliary furnaces in cases where the supply of bagasse is sufficient for the maintenance of steam in the battery of steam boilers; and in lieu of said auxiliary furnaces I contemplate the use of refractory fire beds (shown in Fig. VIII) on either side of a central bagasse furnace.

It is my further purpose to supply heated air to the bagasse furnace to augment the combustion of the green bagasse used as fuel in said bagasse furnace; and I therefore provide a novel air heater (see Figs. VI to XII inclusive) located between the divided battery of steam boilers, or between the walls of the boilers, and a blower connected with said air heater to force the hot air into the bagasse furnace. The air heater I prefer to use in my improved furnace, comprises two mains or pipes, and a series of transverse connecting pipes, one of the main pipes being connected with the blower and the other main delivering air to an air conduit in the bridge wall of the bagasse furnace. The horizontal and transverse pipes form a vertical manifold air heater between a battery of steam boilers; and the said heater may be exposed to the direct heat and products of combustion from the bagasse furnace, or it may be situated in a chamber formed by and between partition walls of the boiler setting, into which chamber the waste gases of combustion may be directed by communicating passages and partitions, in the course of such gases to the outlet or chimney. The air forced by the blower into the bagasse furnace will thus be raised to a temperature corresponding to or approximating the gases and products of combustion.

My invention further relates to novel means for feeding green bagasse between separate sections or battery of water tube boilers from above to a furnace below said boilers; and to attain this end, I sustain the partition walls, above the furnace, with an arch extending over the fire bed from the bridge wall to the front wall, or tiling may be used in lieu of the arch, which tiling extends across the water tubes or from boiler to boiler. In the middle of the partition walls, I form a central vertical feed opening which serves to admit fuel to the furnace below, the fuel being supplied by a conveyer and feeder located above said opening.

Heretofore in connection with water tube boiler furnaces of the class to which this invention relates, it has been customary to place the bagasse burning furnace exteriorly either to the side or front of the boiler setting and the auxiliary furnace, and to conduct the heated air, gases, and products of combustion from such furnaces through intermediate flues and passages. This construction and arrangement of bagasse furnaces with water tube boilers are disadvantageous, in that a very large amount of heat from the bagasse furnace is spent or lost in its transit from the bagasse furnace to the steam generators, by contact with the walls of such intermediate flues and passages, and further, that the heat conveyed by such flues and passages acts on or affects that portion of the generators most exposed to or in close juxtaposition to the said flues. I overcome these difficulties by producing an improved apparatus wherein the heating surfaces are brought directly in contact with the gases and products of combustion, which construction, moreover, dispenses with superfluous masonry, arches and flues, and thus enables the generation and maintenance of steam without loss or waste of fuel.

By dispensing with the exterior furnaces, a marked reduction in the cost of construction is secured, and a material gain in the amount of heating surface is effected, which is due to the increased efficiency of the bagasse furnace situated directly under the steam boilers. To attain these ends, I provide the usual boiler setting of any approved construction and arrange, centrally in the fire bed, in the forward part of the setting, a bagasse furnace 5, which may have grates or not, as may be desired. The bagasse furnace is interposed between the side walls, 3, 3, and it is provided with chambered walls situated a suitable distance apart and extending from the bridge wall 4, to the front wall 2, of the boiler setting.

The side walls have the vertical chambers 6, 7, formed therein, and the inner sides of said walls are provided with tuyere-irons 8, 8, arranged in horizontal rows. The chambers 6, 7, in the side walls of the bagasse-furnace 5, are in communication with an air conduit 15, extending transversely of the boiler setting 1, and formed in the bridge-wall 4, in rear of the bagasse furnace, through which conduit 15, and the chambers 6, 7, the necessary air supply is maintained in the bagasse-furnace, the air being forced by a blower 9, communicating directly with the conduit 15 as shown in Figs. I to V inclusive or by a hot blast apparatus shown in Figs. VI to XII, inclusive. In the same fire-bed and within the walls of the boiler-setting, I provide auxiliary furnaces 10, 11, on either side of the bagasse-furnace 5; or I may dispense with such auxiliary furnaces and use the refractory fire bed 30, 30, indicated in Fig. VIII.

When auxiliary furnaces are used, they may be provided with tuyeres in a manner similar to the bagasse consuming furnace, and the grate bars may be dispensed with or they may be used above and below the grate; but this is not essential.

Above the horizontal plane of the furnaces in the fire bed, are the steam boilers 12, 13, which I prefer to arrange in two separate sections or batteries, as shown; and the sections of the divided battery of boilers are separated by a single partition wall 22, as indicated in Fig. VI or by double partition walls 22, 22, shown in Fig. IX, such double partition walls forming an intermediate chamber 22' for receiving the vertical manifold air heater. The partition wall or walls 22, extend from the bridge wall 4, to the rear wall of the furnace, and are arranged the entire height of the furnace; but forward from the bridge wall, the partition wall or walls, 22, do not extend through the fire bed. That portion of the partition wall or walls forward of the bridge wall is sustained above the fire bed by the arches 21, or by tiling, as shown in the drawings, thereby admitting of a central bagasse furnace in a continuous fire bed which extends the entire width of the boiler setting. In the center of this partition wall 22 is the vertical feed opening 20, arranged intermediately over the bagasse-furnace situated below the partition wall. The arch 21, employed for supporting the partition wall, extends (over the fire bed) from the bridge wall 4, to the front wall of the boiler setting, as shown by Figs. IV and V; but if the tiling is employed, it may rest on the water tubes or generators, as in Figs. I and III. If the auxiliary furnaces 10 and 11, are employed, they may or may not be provided with grates, although they are arranged directly in the same fire-bed with the bagasse-furnace; and draft may be secured in such auxiliary furnaces by tuyere-irons which may open into chambers 6, 7, and the tuyere-irons 8, to the central bagasse furnace 5.

In rear of the bridge wall 4, I locate the air-heater 25, which consists essentially of the two horizontal mains or pipes 26, 27, and the vertical transverse pipes 28, connecting the mains and opening into the same, the whole thus forming a vertical manifold air heater, through which air is to be forced by a superposed blower 29, used in connection with the air heater in lieu of the blower 9, opening directly into the conduit 15, in the bridge wall 4. This air heater may be in the vertical partition wall 22, where only one wall is used as in Figs. VI and VII, or it may be located in the chamber 22' formed by and between the double partition walls 22, Fig. IX. The upper pipe or main 26, is directly connected to the blower 29, while the lower pipe or main opens into or communicates with the conduit 15 in the bridge wall 4, and the air is heated in its passage through the pipes, and forced through the conduit 15, chambers 6 and 7, and tuyere-irons 8, into the bagasse-furnace.

A chimney 30, is used at the rear of the furnace, and an outlet opening 31, is provided for the escape of the products of combustion after they have acted on the boilers and the manifold air heater as shown in Fig. VII; but when the air heater is located in the chamber 22′, a damper 32 may be provided to close the outlet 37, and a horizontal diaphragm 33, may be provided below said opening, to cause the products of combustion to take a circuitous course around the diaphragm to the outlet 34, provided at the base of the chimney, see Fig. X.

The improvements may differ somewhat in construction and be modified to adapt them to the particular arrangement or position to which they are applied.

Having therefore described my invention, what I claim as new, and desire to secure by Letters Patent, is—

1. A bagasse furnace consisting of a central fire chamber 5 adapted to receive and consume bagasse, and auxiliary furnaces, to consume other fuel, situated on opposite sides of the central fire chamber, said bagasse furnace 5 and auxiliary furnaces being situated directly under the forward ends of the steam boilers, and the boilers arranged immediately above and over the central fire chamber and the auxiliary furnaces, the whole being inclosed with the walls of the boiler setting, substantially as and for the purpose described.

2. A bagasse furnace, consisting of a central fire chamber 5 adapted to receive bagasse through an elevated conduit above its bed, the auxiliary furnaces situated on opposite sides of said central chamber and having their fire beds in the transverse line of the bed of the central chamber, said bagasse furnace 5 and the auxiliary furnaces being situated directly under the forward ends of the steam boilers; and the boilers located immediately above the central fire chamber and the auxiliary furnaces, the whole being inclosed within the walls of the boiler setting, as shown and described.

3. The combination of the auxiliary furnaces arranged side by side, the fire chamber 5 between the auxiliary furnaces and in the same transverse line with said auxiliary furnaces, said bagasse furnace 5 and auxiliary furnaces being situated directly under the forward ends of the steam boilers, the walls between the auxiliary furnaces and the central fire chamber being provided with air chambers and tuyere irons 8 that open directly into the central fire chamber, and the generators or boilers immediately above the central fire chamber and the auxiliary furnaces, the whole being within the walls of the boiler setting, as shown and described.

4. The combination of a central bagasse furnace situated within a boiler setting below the steam generators therein, the auxiliary furnaces also situated within the boiler setting, on opposite sides of the bagasse furnace, between the vertical feed opening for the bagasse furnace, said bagasse furnace and auxiliary furnaces being in the same transverse line and at the forward end of the boiler setting, and the air passages between the auxiliary furnaces and the bagasse furnace and communicating directly with the latter furnace, substantially as described.

5. The combination of a bagasse furnace having the refractory fire beds on either side thereof, a battery of steam boilers separated by a partition wall or walls, which extend forward of the bridge wall and sustained above the fire bed by an arch or tiling, directly at the forward end of the boilers substantially as described.

6. The combination of a bagasse furnace having the continuous fire bed at the forward end of the boilers and extending the width of the boiler setting, the battery of steam generators, the partition wall extending forward of the bridge wall over the fire bed and sustained by the arch or tiling, said partition wall having the vertical feed opening above the bagasse furnace, substantially as described.

7. The combination of a bagasse furnace, having its side and bridge walls provided with air chambers, the steam generators, the partition wall having the vertical manifold heater in rear of the bridge wall, and the blower, substantially as described.

8. The combination of a bagasse furnace having its side and bridge walls provided with air chambers, the divided battery of steam boilers separated by a partition wall, the blower, and the vertical manifold heater situated in the partition wall and having its mains connected respectively with the blower and the air chamber in the bridge wall, substantially as described.

9. The combination of a bagasse furnace having its side and bridge walls provided with air chambers, the battery of steam boilers, the double partition walls forming a chamber, the blower, the vertical manifold heater situated in said chamber and having its upper and lower mains connected respectively with the blower and the chamber in the bridge wall, and the horizontal diaphragm arranged between outlets in the chimney, one of said outlets being adapted to be closed by a damper, substantially as described.

In testimony whereof I affix my signature in presence of two witnesses.

WILLIAM WILSON SUTCLIFFE.

Witnesses:
ROBERT FLANNERY,
J. ZACH. SPEARING.